United States Patent [19]
Stultz et al.

[11] Patent Number: 5,251,221
[45] Date of Patent: Oct. 5, 1993

[54] SELF ALIGNING INTRACAVITY RAMAN LASER

[75] Inventors: Robert D. Stultz, Huntington Beach; Michael E. Ehritz, Hermosa Beach, both of Calif.

[73] Assignee: Hughes Aircraft Company, Los Angeles, Calif.

[21] Appl. No.: 926,736

[22] Filed: Aug. 10, 1992

[51] Int. Cl.$^5$ .............................................. H01S 3/30
[52] U.S. Cl. .......................................... 372/3; 372/11; 372/107; 372/108; 372/101; 372/99; 372/70
[58] Field of Search .................... 372/10, 11, 107, 108, 372/100, 101, 99, 70

[56] References Cited

U.S. PATENT DOCUMENTS

| | | | |
|---|---|---|---|
| 4,812,639 | 4/1989 | Byren et al. | 250/203.6 |
| 4,933,943 | 6/1990 | Narhi et al. | 372/3 |
| 5,038,359 | 8/1991 | Pepper et al. | 372/99 |

Primary Examiner—Léon Scott, Jr.
Attorney, Agent, or Firm—Michael W. Sales; Wanda K. Denson-Low

[57] ABSTRACT

Intracavity Raman lasers comprising a pump resonator and a Raman resonator that eliminates alignment problems associated with multi-mirror intracavity lasers. The pump resonators include a laser rod and a pump source. In one embodiment, a first retroreflector is disposed at one end of the pump resonator, and an output mirror is disposed at an opposite end thereof. A Q-switch, a dichroic mirror, and a prism are disposed between the laser rod and the output mirror. The pump resonator radiates pump energy at a first wavelength (1.06 μm) between the first retroreflector and the output mirror. The Raman resonator includes a Raman gas cell having first and second lenses disposed on opposite ends thereof for focusing laser energy into the Raman cell, and a second retroreflector that forms one end of the Raman resonator. The output mirror forms an opposite end of the cell, and the dichroic mirror and the prism are disposed between the second retroreflector and the first lens. The Raman resonator radiates Raman laser energy at a second wavelength (1.54 μm) between the second retroreflector and the output mirror. A second embodiment eliminates the second retroreflector and dichroic mirror and moves the position of the Q-switch to a point between the retroreflector and the laser rod. The present lasers are extremely insensitive to misalignment and have eyesafe output energy and acceptable beam divergence. The present lasers, in a production design, may be mechanically toleranced so that no optical alignment is necessary. Due to their self-aligning nature, the present lasers have fewer components and operate at higher pulse repetition frequencies than conventional multi-mirror intracavity lasers.

17 Claims, 3 Drawing Sheets

SELF ALIGNING INTRACAVITY RAMAN LASER

BACKGROUND

The present invention relates generally to lasers, and more particularly, to a self-aligning intracavity Raman laser.

U.S. Pat. No. 4,933,943 assigned to the assignee of the present invention discloses a three mirror intracavity laser that provides acceptable beam quality and output energy, but has inherent problems in aligning three mirrors that are included therein. The intracavity resonator design of U.S. Pat. No. 4,933,943 is a resonator comprising of three flat mirrors and these mirrors are very difficult to align and keep aligned, in practice. In particular, this alignment problem is a source of concern regarding the producibility and reliability of production lasers employing the intracavity resonator design.

More specifically, in this intracavity resonator design, alignment problems manifested in a variety of ways, including the following. Misalignment of the three mirrors beyond 100 μrad may occur in a harsh military environment, which causes degradation and beam steering of the laser output beam. Rod wedging due to thermal effects causes misalignment, thus limiting the pulse repetition rate of the laser. Alignment of the laser requires special tooling, including an interferometer or autocollimator, and a skilled technician, which increases manufacturing costs. Because of the alignment sensitivity, optical alignment wedges and a heavy, rigid optical bench are used in the laser that further increase the production cost of the laser.

Therefore, it is an objective of the present invention to provide for a laser that is self-aligning and thus minimizes the above-cited problems.

SUMMARY OF THE INVENTION

In order to achieve the above and other objectives, the present invention provides for a self-aligning intracavity Raman laser comprising a pump resonator and a Raman resonator. The pump resonator comprises a laser rod and a pumping means such as a flashlamp used as a pump source disposed adjacent the laser rod for pumping energy into the laser rod. A first retroreflector is disposed at one end of the pump resonator, and an output mirror is disposed at an opposite end of the pump resonator. A Q-switch, a dichroic mirror, and a prism are disposed between the laser rod and the output mirror. The pump resonator is adapted to radiate pump energy at a first wavelength (1.06 μm) between the first retroreflector and the output mirror.

The Raman resonator comprises a Raman gas cell having first and second lenses disposed on opposite ends thereof for focusing laser energy into the Raman cell, a second retroreflector that forms one end of the Raman resonator, and wherein the output mirror forms an opposite end of the Raman resonator. The dichroic mirror and the prism are disposed between the second retroreflector and the first lens. The Raman resonator is adapted to radiate Raman laser energy at a second predetermined wavelength (1.54 μm) between the second retroreflector and the output mirror.

Typically, the first and second retroreflectors each comprise a corner cube. The dichroic mirror is substantially oriented at 45° with respect to the optical axis of the laser defined by a line normal to the output mirror and centered on respective faces of the laser rod. Typically, the first and second lenses are plano-convex lenses. The Q-switch may be comprised of a dye-impregnated acetate sheet sandwiched between glass plates, and wherein the dye-impregnated acetate sheet has an optical density of about 0.42. The dichroic mirror may be coated so that it is highly reflective to 1.06 μm wavelength laser energy and highly transmissive at 1.54 μm wavelength laser energy.

The present invention is extremely insensitive to misalignment and has a very good eyesafe output energy and beam divergence similar to the intracavity Raman laser resonator described in U.S. Pat. No. 4,933,943. In comparison to the somewhat difficult alignment problems of the above-cited laser, the present invention, in a production design, may be mechanically toleranced so that no optical alignment is necessary. Due to its self-aligning nature, the present invention uses a fewer number of components and operates at a higher pulse repetition frequency (PRF) than the intracavity design of U.S. Pat. No. 4,933,943.

The self-aligning nature of the present invention eliminates the strict alignment requirements of the three-mirror intracavity laser. This has many advantages, including the following. Manufacturing labor costs are significantly reduced since the present laser can be assembled without optical alignment. The laser performance is extremely insensitive to mirror misalignment after assembly. The optical bench used in the present laser may be made of less rigid, light-weight materials and provides good laser performance when operating in harsh environmental conditions. Misalignment due to rod wedging is eliminated. Since pump and Raman beams are always aligned to the output mirror, only output mirror tilting affects laser boresight. The pulse repetition frequency (PRF) may be increased over the laser disclosed in U.S. Pat. No. 4,933,943.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
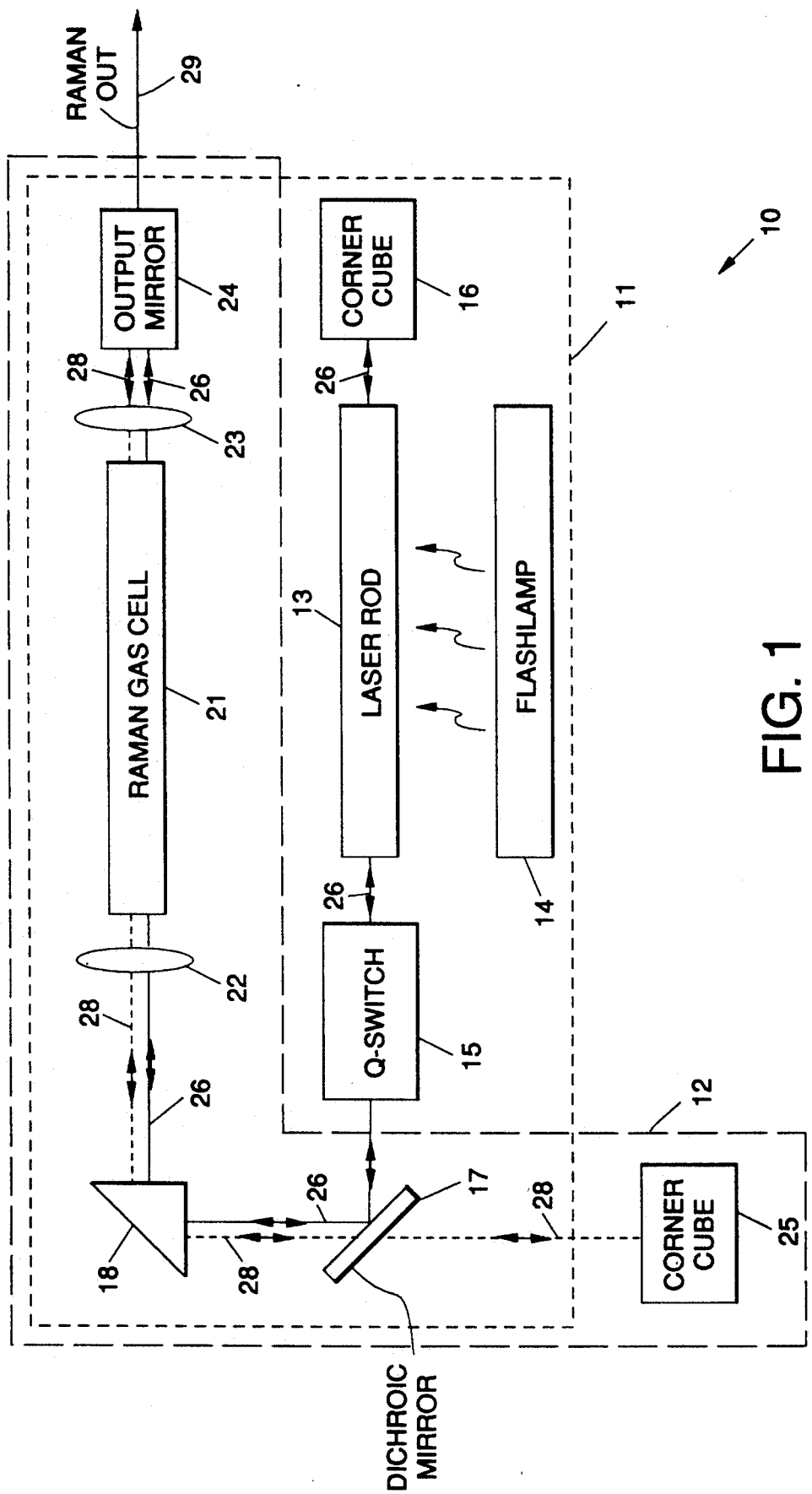
FIG. 1 shows a diagram of a first embodiment of a self-aligning intracavity Raman laser in accordance with the principles of the present invention.

Referring to the drawing figures, FIG. 1 shows a first embodiment of a self-aligning intracavity Raman laser 10 in accordance with the principles of the present invention. This self-aligning intracavity Raman laser 10 has been built and tested in breadboard form and test data is presented below with reference to FIG. 2. The self-aligning intracavity Raman laser 10 comprises a pump resonator 11 and a Raman resonator 12. The pump resonator 11 is shown surrounded by a rectangular box having a closely spaced dashed line, while the Raman resonator 12 is shown as having an L-shaped arrangement and is surrounded by dashed line having a longer dash pattern.

The pump resonator 11 is comprised of a laser rod 13 that is pumped by means of a flashlamp 14, for example. A corner cube 16 forms one end of the pump resonator 11. An output mirror 24, which may be wholly reflective or partially transmissive at the pump wavelength, forms an opposite end of the pump resonator 11. The pump resonator 11 is adapted to radiate pump energy along a first optical path 26 between its respective ends formed by the corner cube 16 and the output mirror 24. The first optical path 26 is illustrated as U-shaped and the U-shape is formed by using a dichroic mirror 17 oriented at 45° with respect to the first optical path 26 and a prism 18 disposed along the first optical path 26 between the Q-switch 15 and the output mirror 24. The pump laser 11 is adapted to radiate 1.06 μm wavelength laser energy.

The Raman resonator 12 is comprised of a Raman gas cell 21 having first and second lenses 22, 23 disposed on opposite ends thereof. The output mirror 24 forms one end of the Raman resonator 12 and a second corner cube 25 forms an opposite end thereof. The dichroic mirror 17 and the prism 18 are disposed between the second corner cube 25 and the first lens 22 and also form part of the Raman resonator 12. The Raman resonator 12 is adapted to radiate Raman laser energy along a second optical path 28 between its respective ends formed by the second corner cube 25 and the output mirror 24. The Raman laser 11 is adapted to radiate 1.54 μm wavelength laser energy.

The laser rod 13 may be Nd:YAG, 5 mm in diameter and 60 mm long for example. The Q-switch 15 may be comprised of a dye-impregnated acetate sheet (optical density=0.42) sandwiched between glass plates, for example. The dichroic mirror 17 is coated so that it is highly transmissive at 1.54 μm (Raman) and highly reflective at 1.06 μm (pump). The first and second lenses 22, 23, used to focus and recollimate the light in the Raman cell 21, are formed as plano-convex lenses and may have 63 mm and 38 mm focal lengths, respectively. The output mirror 24 is coated so that it is 100% reflective at 1.06 μm (pump wavelength) and 28% reflective at 1.54 μm (Raman wavelength).

The corner cubes 16, 25 are retroreflecting, so both resonators 11, 12 are self-aligning in angle. However, in the breadboard prototype that was built and tested, the apex of each corner cubes 16, 25 were centered (translation only) on the optical axis of the self-aligning intracavity Raman laser 10, defined as a line normal to the output mirror 24 and centered on the respective faces of the laser rod 13. In a production version of the present self-aligning intracavity Raman laser 10, this "centering" of the corner cubes 16, 25 would be accomplished by mechanical tolerancing of the components.

Figure 2:
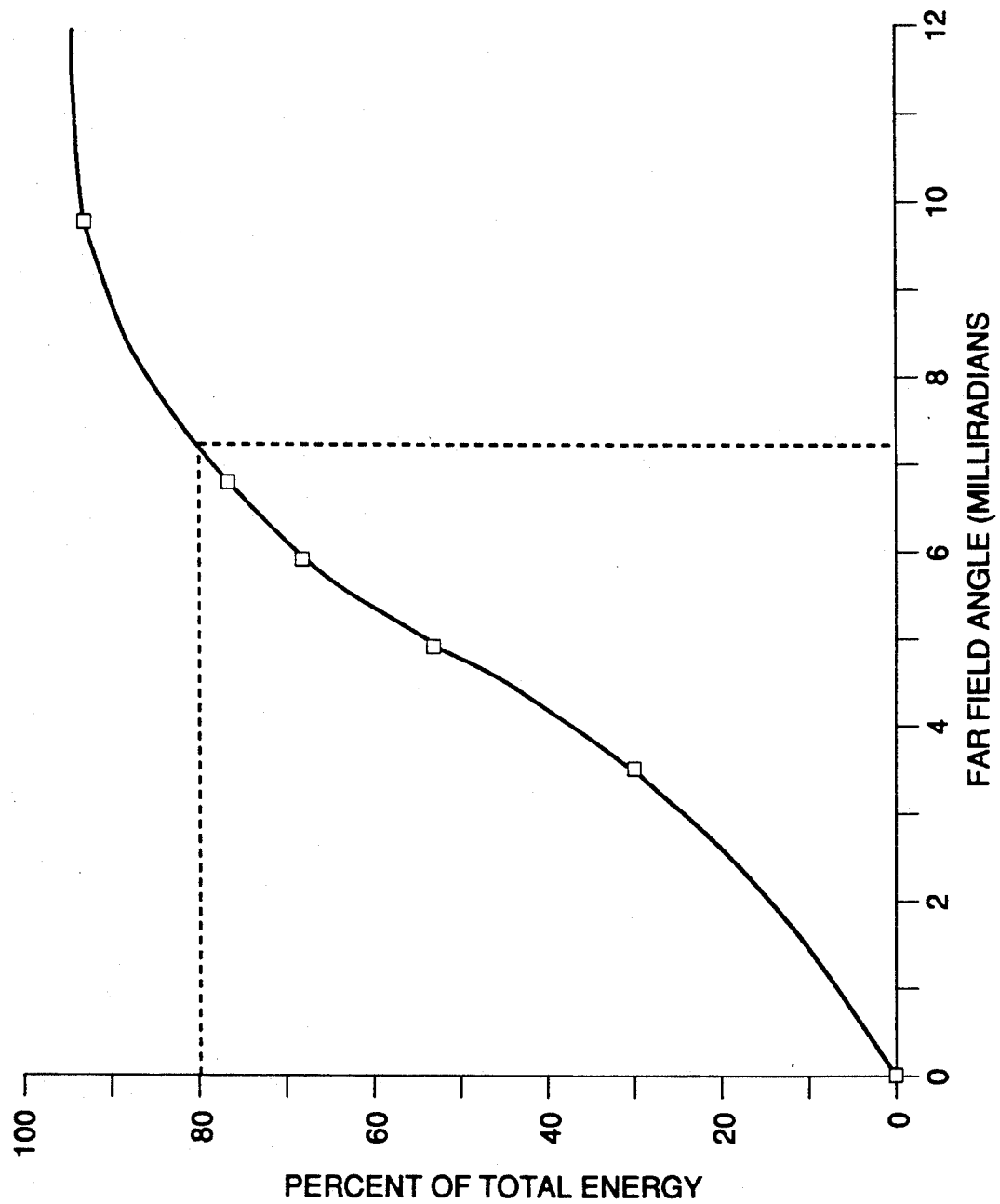
FIG. 2 is a graph showing the beam divergence of the self-aligning intracavity Raman laser of FIG. 1.

A breadboard version of the self-aligning intracavity Raman laser 10 was built and tested. The input energy of the flashlamp 14 at threshold was 6 joules. The 1.54 μm output energy beam 29 (identified in FIG. 1 as "Raman out") of the breadboard self-aligning intracavity Raman laser 10 was 10 millijoules±0.5 millijoules. The 1.54 μm beam divergence data is shown in FIG. 2. Eighty percent of the output energy of the beam 29 is contained within about 7.2 milliradians. The diameter of the output beam 29 was about 3.0 mm, (5 mm×(38/63)). A figure of merit for the quality of the output beam 29 is beam divergence times beam diameter. In the case of the breadboard version of the self-aligning intracavity Raman laser 10, the beam quality is 7.2×3.0=21.7 mm-mrad. For comparative purposes, the three mirror laser disclosed in U.S. Pat. No. 4,933,943 has an 11 millijoule output and a beam quality of about 20 mm-mrad. The differences between the two designs with respect to output energy and beam quality are considered to be within acceptable limits.

The pulsewidth of the 1.54 μm output beam 29 for the breadboard of the self-aligning intracavity Raman laser 10 was a steady 5 nanoseconds. In comparison, the pulsewidth of the three mirror design of U.S. Pat. No. 4,933,943 shows a variation from 6 to 12 nanoseconds. This variation is believed to be a result of the difficulties involved in aligning the three mirrors. For many applications, this pulsewidth variation does not affect system performance; however, a steadier pulsewidth is more desirable, and is achieved in the present self-aligning intracavity Raman laser 10.

Figure 3:
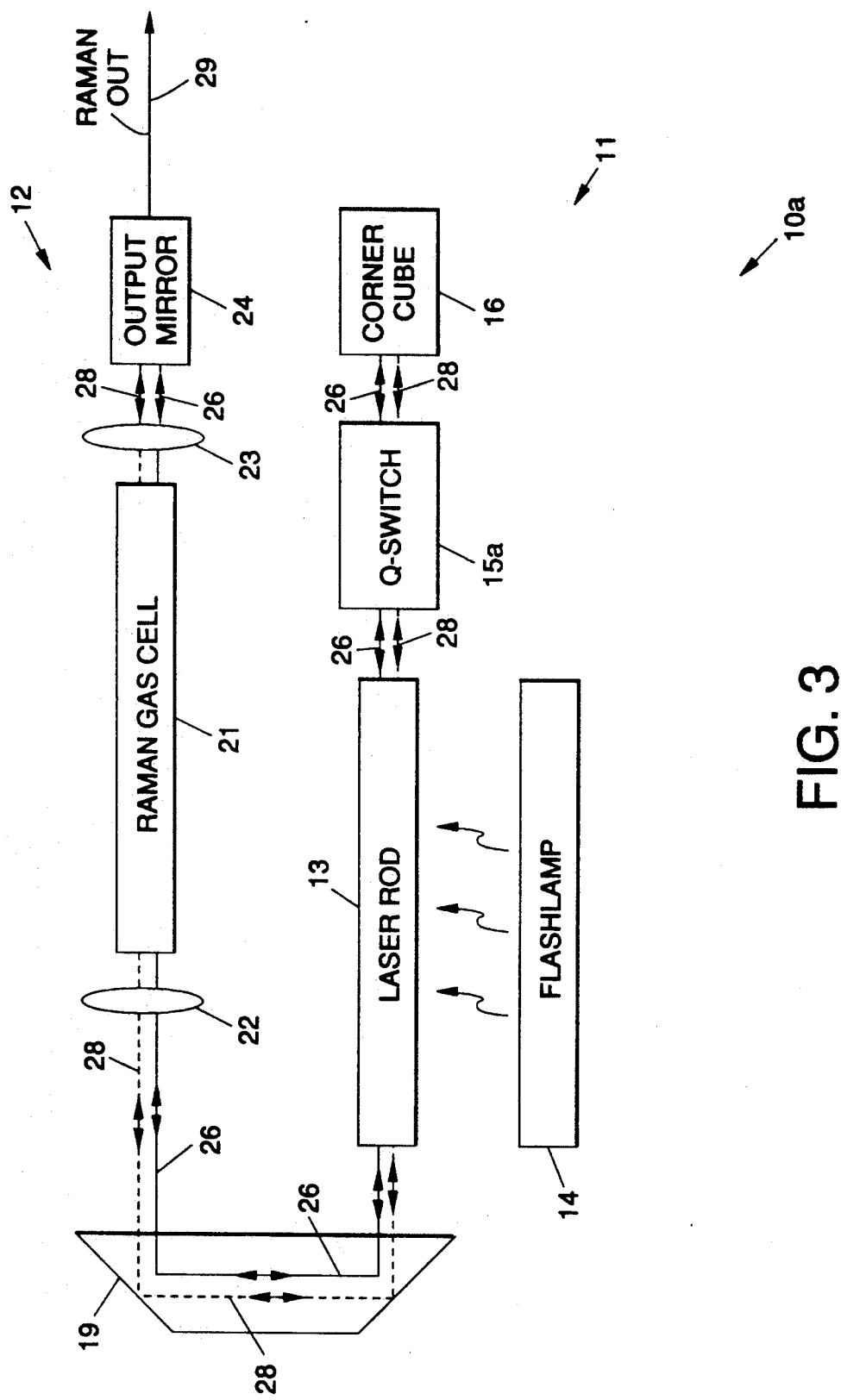
FIG. 3 illustrates a second embodiment of a self-aligning intracavity Raman laser in accordance with the principles of the present invention.

FIG. 3 illustrates a second embodiment of a self-aligning intracavity Raman laser 10a in accordance with the principles of the present invention. The self-aligning intracavity Raman laser 10a is comprised of the majority of the components of the laser 10 of FIG. 1, but uses a folding prism 19 in place of the prism 18 and dichroic mirror 17. The second embodiment is thus arranged in a U-shape. The second embodiment employs a common retroreflector (corner cube) 16 for reflecting 1.06 μm and 1.54 μm wavelength energy from both of the resonators 12, 13. The dichroic mirror 17 and the second retroreflector 25 in the first embodiment is thus eliminated. The construction of this second laser 10a is substantially the same as described above for the first laser 10.

The second laser 10a was also built and tested. The second laser 10a is operable, but the 1.54 μm output was about one-half the output of the first laser 10. Significant losses were measured through the Nd:YAG laser rod 13 around the 1.54 μm wavelength. It has not been determined whether the losses are due to the bulk rod 13 or the anti-reflective coatings (anti-reflective at 1.06 μm only). These losses may be the cause of the reduced output. If these losses are eliminated, along with any 1.54 μm losses in the Q-switch 15a, and the 1.54 μm output is increased, then the second laser 10a would be more desirable than the first laser 10, for substantially all applications in which it is used.

Thus, there has been described new and improved self-aligning intracavity Raman lasers that have improved alignment characteristics and whose output beam exhibits a more stable pulsewidth. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A self-aligning intracavity Raman laser comprising:
   a pump resonator comprising:
   a laser rod;
   pumping means disposed adjacent the laser rod for pumping energy into the laser rod;
   a first retroreflector disposed at one end of the pump resonator;
   an output mirror disposed at an opposite end of the pump resonator;
   a Q-switch disposed between the laser rod and the output mirror;

a dichroic mirror disposed between the Q-switch and the output mirror; and a prism disposed between the dichroic mirror and the output mirror;

wherein the pump resonator is adapted to radiate pump energy at a first predetermined wavelength between the first retroreflector and the output mirror; and a Raman resonator comprising:

a Raman gas cell having first and second lenses disposed on opposite ends thereof for focusing laser energy into the Raman cell; and a second retroreflector that forms one end of the Raman resonator;

wherein the output mirror forms an opposite end of the Raman resonator, and wherein the dichroic mirror and the prism are disposed between the second retroreflector and the first lens, and wherein the Raman resonator is adapted to radiate Raman laser energy at a second predetermined wavelength between the second retroreflector and the output mirror.

2. The self-aligning intracavity Raman laser of claim 1 wherein the pump resonator is adapted to radiate 1.06 $\mu$m wavelength laser energy and the Raman resonator is adapted to radiate 1.54 $\mu$m wavelength laser light.

3. The self-aligning intracavity Raman laser of claim 2 wherein the dichroic mirror is coated so that it is highly reflective to 1.06 $\mu$m wavelength laser energy and highly transmissive at 1.54 $\mu$m wavelength laser energy.

4. The self-aligning intracavity Raman laser of claim 3 wherein the output mirror is coated so that it is substantially 100% reflective 1.06 $\mu$m wavelength laser energy and approximately 28% reflective at 1.54 $\mu$m wavelength laser energy.

5. The self-aligning intracavity Raman laser of claim 1 wherein the first and second retroreflectors each comprise a corner cube.

6. The self-aligning intracavity Raman laser of claim 1 wherein the dichroic mirror is substantially oriented at 45° with respect to an optical axis of the laser defined by a line normal to the output mirror and centered on respective faces of the laser rod.

7. The self-aligning intracavity Raman laser of claim 1 wherein the first and second lenses are plano-convex lenses.

8. The self-aligning intracavity Raman laser of claim 1 wherein the Q-switch is comprised of a dye-impregnated acetate sheet sandwiched between glass plates.

9. The self-aligning intracavity Raman laser of claim 8 wherein the dye-impregnated acetate sheet has an optical density of about 0.42.

10. The self-aligning intracavity Raman laser of claim 1 wherein the dichroic mirror is coated so that it is highly reflective at the first predetermined wavelength and highly transmissive at the second predetermined wavelength.

11. The self-aligning intracavity Raman laser of claim 1 wherein the pumping means comprises a flashlamp.

12. A self-aligning intracavity Raman laser comprising:

a pump resonator comprising:

a laser rod;

pumping means disposed adjacent the laser rod for pumping energy into the laser rod;

a retroreflector disposed at one end of the pump resonator;

an output mirror disposed at an opposite end of the pump resonator;

a Q-switch disposed between the laser rod and the retroreflector; and a prism disposed between the laser rod and the output mirror;

wherein the pump resonator is adapted to radiate pump energy at a first predetermined wavelength between the first retroreflector and the output mirror; and a Raman resonator comprising:

a Raman gas cell having first and second lenses disposed on opposite ends thereof for focusing laser energy into the Raman cell; and wherein the retroreflector forms one end of the Raman resonator and the output mirror forms an opposite end of the Raman resonator, and wherein the prism is disposed between the retroreflector and the first lens, and wherein the Raman resonator is adapted to radiate Raman laser energy at a second predetermined wavelength between the retroreflector and the output mirror.

13. The self-aligning intracavity Raman laser of claim 12 wherein the pump resonator is adapted to radiate 1.06 $\mu$m wavelength laser energy and the Raman resonator is adapted to radiate 1.54 $\mu$m wavelength laser light.

14. The self-aligning intracavity Raman laser of claim 12 wherein the first and second retroreflectors each comprise a corner cube.

15. The self-aligning intracavity Raman laser of claim 12 wherein the first and second lenses are plano-convex lenses.

16. The self-aligning intracavity Raman laser of claim 12 wherein the output mirror is coated so that it is substantially 100% reflective 1.06 $\mu$m wavelength laser energy and approximately 28% reflective at 1.54 $\mu$m wavelength laser energy.

17. The self-aligning intracavity Raman laser of claim 12 wherein the pumping means comprises a flashlamp.

* * * * *